US008116793B2

(12) United States Patent
Kwon et al.

(10) Patent No.: US 8,116,793 B2
(45) Date of Patent: Feb. 14, 2012

(54) APPARATUS AND METHOD FOR AUTOMATICALLY CONTROLLING INTERFERENCE IN BROADBAND WIRELESS COMMUNICATION SYSTEM

(75) Inventors: Il-Won Kwon, Ansan-si (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 12/416,881

(22) Filed: Apr. 1, 2009

(65) Prior Publication Data
US 2009/0253448 A1 Oct. 8, 2009

(30) Foreign Application Priority Data

Apr. 2, 2008 (KR) .................. 10-2008-0030666

(51) Int. Cl.
*H04B 7/00* (2006.01)
(52) U.S. Cl. ............... 455/501; 455/63.1; 455/67.13
(58) Field of Classification Search ............. 455/63.1, 455/67.13, 501
See application file for complete search history.

(56) References Cited

U.S. PATENT DOCUMENTS

| 6,131,015 | A  | * | 10/2000 | Hill et al. ............ 455/69 |
| 7,457,590 | B2 | * | 11/2008 | Frank ................. 455/69 |
| 7,483,713 | B2 | * | 1/2009  | Mori et al. ............ 455/522 |
| 7,885,604 | B2 | * | 2/2011  | Wee et al. ............ 455/63.1 |
| 7,949,040 | B2 | * | 5/2011  | Yoshida et al. ........ 375/227 |

* cited by examiner

*Primary Examiner* — James H Cho
(74) *Attorney, Agent, or Firm* — Jefferson IP Law, LLP

(57) ABSTRACT

An apparatus and method for automatically controlling interference in a broadband wireless communication system are provided. In the method, a BS receives an interference measurement information signal of one or more adjacent BSs. The BS analyzes the interference measurement information signal of the one or more adjacent BSs to obtain information about the average power for each frequency band used by each of the one or more adjacent BSs. The BS uses the obtained information about the average power for each frequency band of the one or more adjacent BSs to determine the average power for each frequency band to be used by the BS. The BS generates an interference measurement information signal of the BS according to the determined average power for each frequency band.

26 Claims, 7 Drawing Sheets

APPARATUS AND METHOD FOR AUTOMATICALLY CONTROLLING INTERFERENCE IN BROADBAND WIRELESS COMMUNICATION SYSTEM

PRIORITY

This application claims the benefit under 35 U.S.C. §119 (a) of a Korean patent application filed in the Korean Intellectual Property Office on Apr. 2, 2008 and assigned Serial No. 10-2008-0030666, the entire disclosure of which is hereby incorporated by reference.

BACKGROUND OF THE INVENTION

1. Field of the Invention

The present invention relates to an apparatus and method for automatically controlling interference in a broadband wireless communication system. More particularly, the present invention relates to an apparatus and method for automatically controlling interference in a broadband wireless communication system considering various communication environments, by communicating interference measurement information between adjacent cells.

2. Description of the Related Art

Because an outdoor mobile communication environment and an indoor short-range communication environment have different conditions, different communication systems support communications for the respective communication environments. For example, outdoor mobile communication systems such as Global System for Mobile telecommunication (GSM), Industry Standard-95 (IS-95), Wideband Code Division Multiple Access (WCDMA) and Code Division Multiple Access-2000 (CDMA-2000) have been developed for the outdoor mobile communication environment, and indoor short-range communication systems such as Institute of Electrical and Electronics Engineers (IEEE) 802.11a, IEEE 802.11b and Wireless Fidelity (WiFi) have been developed for the indoor short-range communication environment. The outdoor mobile communication systems and the indoor short-range communication systems have been developed and used in accordance with their respective purposes and communication environments. That is, the outdoor mobile communication systems have been used mainly for voice communication in a mobile environment, and the indoor short-range communication systems have been used mainly for notebook computer-based data communication in an indoor environment.

However, since users' requirements are becoming increasingly diversified and complicated, the next-generation communication systems must be able to integratedly and simultaneously provide a variety of voice/data communication services anywhere in both the indoors and outdoors. In the current environment where an outdoor mobile communication system and an indoor short-range communication system are separate from each other, a scheme of integrating the two separate systems into one system can be easily conceived to satisfy the aforesaid requirements. This scheme, however, has the following problems.

Firstly, the interworking between the two systems is complex and a processing delay may occur. A vertical handover technology such as a Media Independent Handover (MIH) technology is being developed to address this problem, but it still requires a complex protocol and process. Secondly, because the two systems use different frequency bands, it is difficult to use a flexible frequency band. For example, the indoor short-range communication system uses an unlicensed band and the outdoor mobile communication system uses a licensed band. Therefore, it is difficult for the indoor short-range communication system to use a licensed band in order to increase the indoor communication reliability. Thirdly, because a Mobile Station (MS) must have a function for using both of the two systems, the implementation complexity of the MS increases.

One of the methods for addressing the above problems is to miniaturize a mobile Base Station (BS) of the outdoor mobile communication system and install the miniaturized mobile BS indoors. Hereinafter, the miniaturized mobile BS will be referred to as a micro BS. This technique does not experience the problems caused by the interworking between the heterogeneous systems, and enables the service provider to flexibly use the frequency resources. However, according to the above technique, a communication system adapted to the outdoor mobile communication environment is used indoors without modification, and it has a lower efficiency than a system adapted to the indoor short-range communication environment. In addition, the outdoor mobile communication system operates based on a Global Positioning System (GPS), but the indoor short-range communication system has difficulty in using GPS.

A self-configuration function for automatically selecting a variety of optimal parameters in a given communication environment is desired in order to reduce the initialization cost and to implement the efficient operation of the indoor short-range communication system. However, even with the self-configuration function, there are still many unaddressed problems. In particular, the problem of controlling the interference between adjacent cells may greatly affect the system performance. What is therefore desired is the development of an interference control technique using the self-configuration function.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for automatically controlling interference in a broadband wireless communication system.

Another aspect of the present invention is to provide an apparatus and method for automatically controlling interference in a broadband wireless communication system considering various communication environments, by communicating interference measurement information between adjacent cells.

Yet another aspect of the present invention is to provide an apparatus and method for obtaining, by a BS, power mask information of adjacent cells in a broadband wireless communication system by analyzing interference measurement information signals of adjacent BSs notified from MSs in its cell, determining its power mask by using the obtained power mask information of the adjacent cells, and generating/transmitting its interference measurement information signal according to the determined power mask.

Still another aspect of the present invention is to provide an apparatus and method for communicating an interference measurement information signal of each cell in a broadband wireless communication system in order to manage resources for different frequencies.

In accordance with an aspect of the present invention, a method for operating a BS for interference control in a wireless communication system is provided. The method includes receiving an interference measurement information signal of one or more adjacent BSs, analyzing the interference measurement information signal of the one or more adjacent BSs to obtain information about the average power for each frequency band used by each of the one or more adjacent BSs, using the obtained information about the average power for each frequency band of the one or more adjacent BSs to determine the average power for each frequency band to be used by the BS, and generating an interference measurement information signal of the BS according to the determined average power for each frequency band.

In accordance with another aspect of the present invention, a method for operating an MS for interference control in a wireless communication system is provided. The method includes receiving a receive/report request for an inter-BS synchronization signal transmitted by one or more adjacent BSs from a BS, transmitting synchronization signal RX report to the BS upon receiving the inter-BS synchronization signal from the one or more adjacent BSs, receiving a receive/report request for an interference measurement information signal transmitted by the one or more adjacent BSs from the BS, and receiving the interference measurement information signal from the one or more adjacent BSs and transmitting an interference measurement information signal RX report to the BS.

In accordance with yet another aspect of the present invention, an apparatus of a BS for interference control in a wireless communication system is provided. The apparatus includes an interference measurement information processor for receiving an interference measurement information signal of one or more adjacent BSs and for analyzing the interference measurement information signal of the one or more adjacent BSs to obtain information about the average power for each frequency band used by each of the one or more adjacent BSs, and a power mask determiner for using the obtained information about the average power for each frequency band of the one or more adjacent BSs to determine the average power for each frequency band to be used by the BS.

In accordance with still another aspect of the present invention, an apparatus of an MS for interference control in a wireless communication system is provided. The apparatus includes a frame synchronization signal processor for receiving a BS-MS synchronization signal from a BS, and an interference measurement information receiver for receiving a receive/report request for an inter-BS synchronization signal transmitted by one or more adjacent BSs from the BS, for receiving the inter-BS synchronization signal from the one or more adjacent BSs, for transmitting synchronization signal RX report to the BS, for receiving a receive/report request for an interference measurement information signal transmitted by the one or more adjacent BSs from the BS, for receiving the interference measurement information signal from the one or more adjacent BSs, and for transmitting an interference measurement information signal RX report to the BS.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention are described below with reference to the accompanying drawings. In the following description, detailed descriptions of well-known functions or constructions will be omitted since they would obscure the invention in unnecessary detail.

Exemplary embodiments of the present invention provide an apparatus and method for automatically controlling interference in a broadband wireless communication system. The following description is made in the context of an Orthogonal Frequency Division Multiplexing (OFDM) wireless communication system, to which the present invention is not limited. Thus, it should be clearly understood that the present invention is also applicable to any other wireless communication systems.

Figure 1:
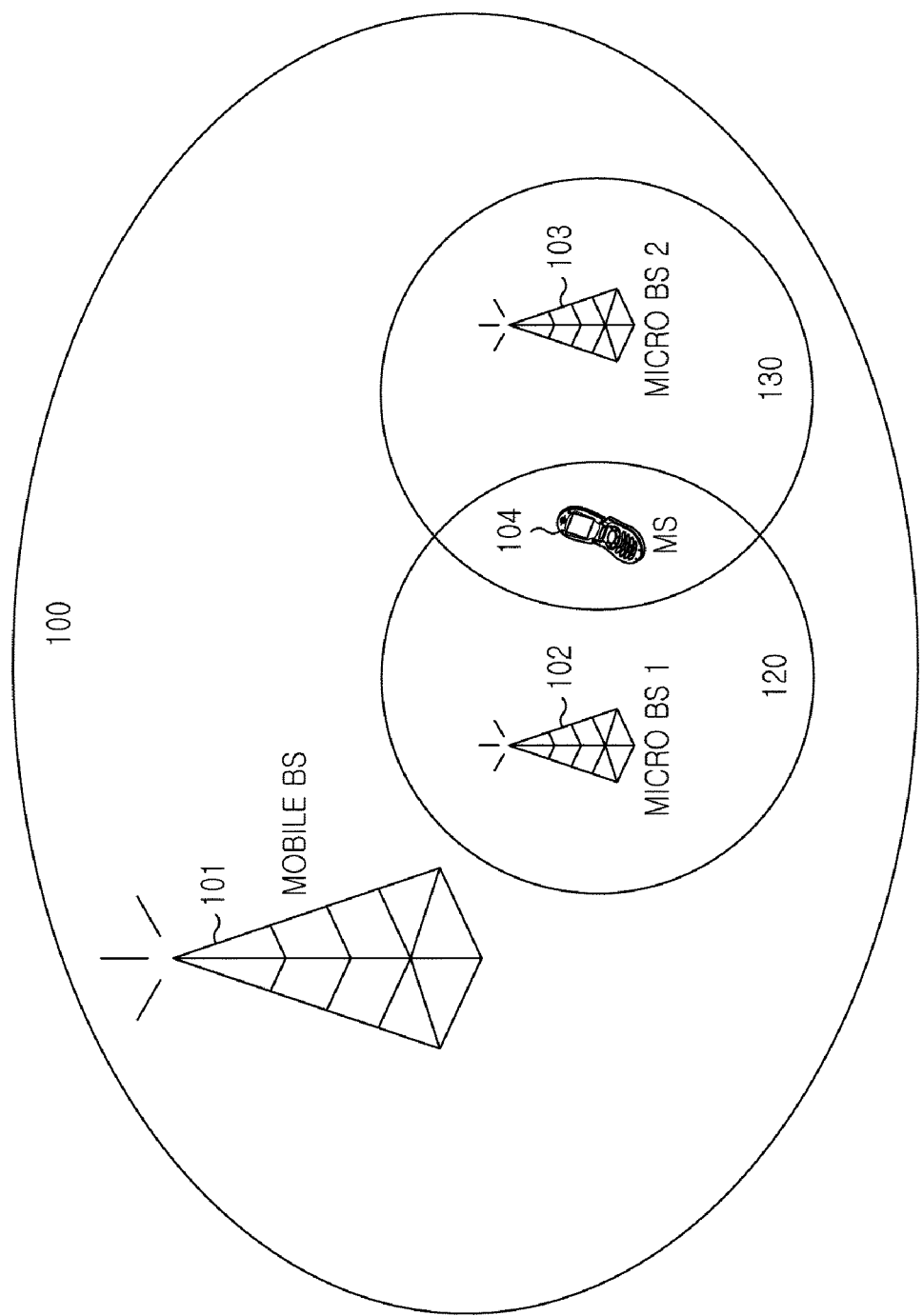
FIG. 1 is a diagram illustrating various communication environments according to exemplary embodiments of the present invention.

FIG. 1 is a diagram illustrating various communication environments according to exemplary embodiments of the present invention.

Referring to FIG. 1, a cell 100 having a large coverage area (hereinafter referred to as a large-coverage area cell) and cells 120 and 130 having a relatively small coverage area (hereinafter referred to as small-coverage area cells) are illustrated. The large-coverage area cell 100 corresponds to a cell for outdoor mobile communication, and the small-coverage area cells 120 and 130 correspond to cells for indoor short-range communication or mobile communication in a small outdoor area. The cells illustrated in FIG. 1 may be one of a macro-cell, a micro-cell, a pico-cell and a femto-cell, and may correspond to a variety of other communication environments. The communication environments between the large-coverage area cell 100 and the small-coverage area cells 120 and 130 have different characteristics in terms of various aspects such as transmit (TX) power, multipath fading characteristics, interference characteristics, and Doppler effects due to the movement of a Mobile Station (MS). Hereinafter, for convenience of description, the communication environment of the large-coverage area cell 100 will be referred to as an outdoor mobile communication environment, and the communication environment of the small-coverage area cells 120 and 130 will be referred to as an indoor short-range communication environment. A mobile Base Station (BS) 101 in the large-coverage area cell 100 provides a communication service to an MS 104 in the corresponding coverage area, and micro BSs 102 and 103 in the small-coverage area cells 120 and 130 provide a communication service to an MS 104 in the corresponding coverage area.

In order to support both the outdoor mobile communication environment and the indoor short-range communication environment, the wireless communication system of an exemplary embodiment of the present invention performs a communication using a super-frame. The structure of the super-frame will be described with reference to FIG. 2.

Figure 2:
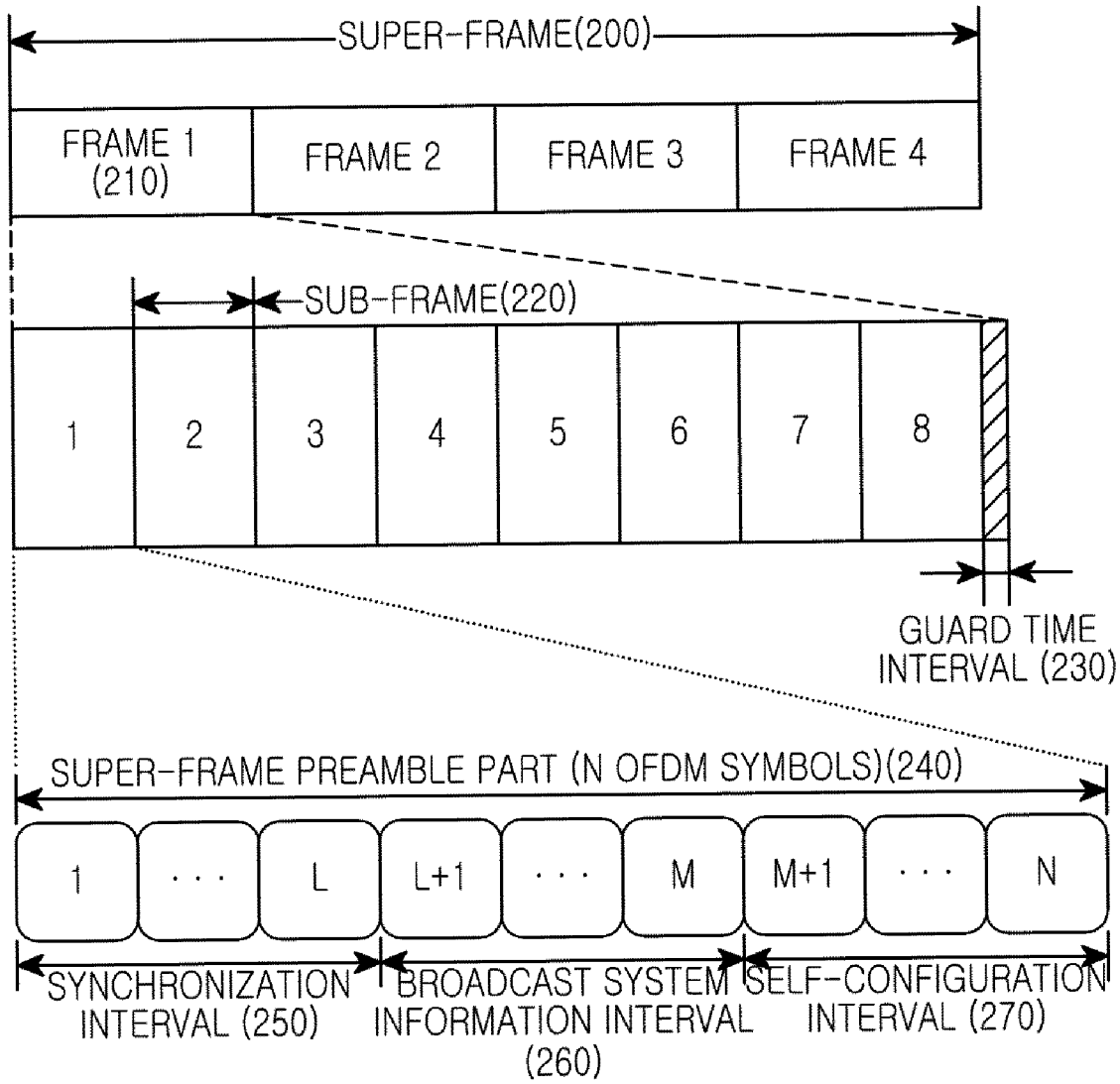
FIG. 2 is a diagram illustrating a super-frame structure of a broadband wireless communication system according an exemplary embodiment of the present invention.

FIG. 2 is a diagram illustrating a super-frame structure of a broadband wireless communication system according an exemplary embodiment of the present invention Referring to FIG. 2, a super-frame 200 includes one or more frames 210, and each of the one or more frames 210 includes one or more sub-frames 220 and a guard time interval 230. Herein, the first frame 210 of the super-frame 200 includes a super-frame preamble part 240 as a super-frame header, and the super-frame preamble part 240 has a common signal structure with respect to different communication environments. Herein, the super-frame preamble part 240 is used to communicate signals for BS system information, inter-BS synchronization/interworking, self configuration, and inter-ference management. Thus, the signals communicated through the super-frame preamble part 240 are designed to be robust so that they can be received even in a poor communication environment. The parts other than the super-frame preamble part 240 in the super-frame 200 are used to communicate a user signal optimized for each communication environment and signals for control/management of the user signal. The length of the super-frame 200, the length of the super-frame preamble part 240, and the position of the super-frame preamble part 240 in the super-frame 200 are determined according to settings of the system. However, the signal structure of the parts other than the super-frame preamble part 240 varies depending on the communication environment.

Herein, the super-frame preamble part 240 may include a synchronization interval 250, a broadcast system information interval 260, and a self-configuration interval 270. The synchronization interval 250 is used to notify the start of the super-frame 200, acquire the time/frequency synchronization between the BS and the MS, and transmit a signal for discrimination of the BS and the cell. The broadcast system information interval 260 is used to transmit information for the MS in order to perform a communication between the BS and the MS. For example, the information for the MS includes information about the structure of the super-frame 200 and system parameters. The self-configuration interval 270 is used to acquire inter-BS synchronization, transmit an inter-cell interference measurement information signal, and transmit handover-related information.

An inter-BS synchronization acquisition function provided through the self-configuration interval 270 will be described below. When one BS transmits a predefined synchronization signal through the self-configuration interval 270, the other BS receives the synchronization signal to acquire the super-frame synchronization with the BS that has transmitted the synchronization signal. This synchronization acquisition method is very useful for a micro BS incapable of using a Global Positioning System (GPS). That is, the micro BS receives a synchronization signal from a mobile BS capable of using the GPS, and uses the received synchronization signal to acquire the synchronization with the mobile BS. In addition, other micro BSs receive a synchronization signal from the micro BS synchronized with the mobile BS, and use the received synchronization signal to acquire the synchronization with the micro BS. If other BSs are incapable of using GPS, the one BS is used to synchronize the other BSs, so that the BSs incapable of using the GPS acquire the synchronization therebetween.

An inter-cell interference measurement information signal transmission function provided through the self-configuration interval 270 is described below. The inter-cell interference measurement information signal transmission function is performed sequentially according to a predefined order in such a way that the one BS transmits an interference measurement information signal and the other BSs receive the interference measurement information signal. Herein, the interference measurement information signal has a predefined format and has a variable size on the frequency axis. This is to represent the average power of a user signal in the corresponding frequency band by varying the size of the interference measurement information signal according to the respective frequency bands. That is, if the signal size of a specific band of the received interference measurement information signal is 'K', it indicates that the average power of the user signal transmitted in the specific band from the corresponding BS is 'K'. Thus, each BS can perform an interference control by using an interference measurement information signal for each band received from an adjacent BS. The interference measurement is performed by the MS. That is, the MS receives an interference measurement information signal from adjacent BSs and feeds the received interference measurement information signal back to a serving BS. At this point, the serving BS can perform an efficient interference control by obtaining the interference measurement information signal of the MS. Herein, the BS may directly perform the interference measurement. In this case, the BS requires an amount of time for conversion from a TX mode to a receive (RX) mode in order to receive the interference measurement information signal of the adjacent BS. Thus, a Cyclic Prefix (CP) or a guard time interval is present before and after the interference measurement information signal, which is designed to be longer than a CP or a guard time interval of an OFDM signal. In this way, by designing the CP or the guard time interval to be long, a signal can be reliably received from a remote BS even when the signal has a long time delay.

The BS can detect the frequency resource management characteristics for each cell by using the size of the interference measurement information signal for each band of each cell through the self-configuration interval 270. Based on that described above, the BS can determine the size of a frequency signal that is optimal for its cell, i.e., a power mask, by using a suitable interference management algorithm. Each cell transmits a user signal and an interference measurement information signal according to the power mask and receives an interference measurement information signal of another cell to change its power mask periodically. Herein, the power mask determination may be performed by the BS or a network resource manager.

Hereinafter, the BSs according to exemplary embodiments of the present invention are represented by the micro BSs 102 and 103 of the indoor short-range communication environment, to which the present invention is not limited. Thus, it should be clearly understood that the present invention is also applicable to the mobile BS 101 of the outdoor mobile communication environment.

Figure 3:
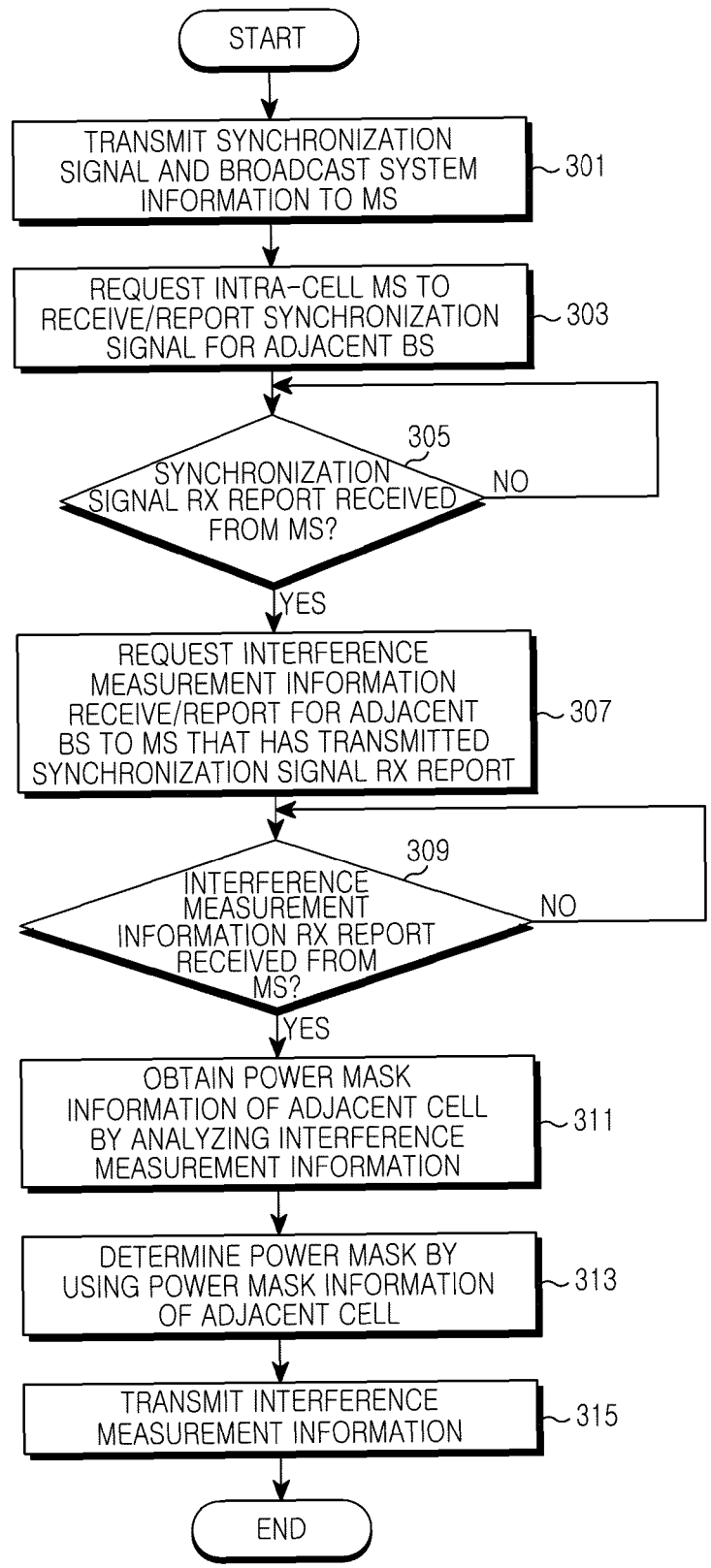
FIG. 3 is a flowchart illustrating an operation of a Base Station (BS) for automatically performing an interference control between adjacent cells in a broadband wireless communication system in consideration of various communication environments according to an exemplary embodiment of the present invention.

FIG. 3 is a flowchart illustrating an operation of a BS for automatically performing an interference control between adjacent cells in a broadband wireless communication system in consideration of various communication environments according to an exemplary embodiment of the present invention.

Referring to FIG. 3, in step 301, the BS transmits a BS-MS synchronization signal and a broadcast system information signal to intra-cell MSs in the broadcast system information interval and the synchronization interval of the frame.

In step 303, the BS requests the intra-cell MSs to receive/report an inter-BS synchronization signal transmitted by adjacent BSs in the self-configuration interval of the frame. In step 305, the BS determines whether a synchronization signal RX report is received from the intra-cell MSs.

If the synchronization signal RX report is received, the BS proceeds to step 307. In step 307, the BS requests the intra-cell MSs that have transmitted a synchronization signal RX report to receive/report an interference measurement information signal transmitted by adjacent BSs in the self-configuration interval of the frame. In step 309, the BS determines whether an interference measurement information signal RX report is received. Herein, the interference measurement information signal has a predefined format, and the size of the interference measurement information signal for each frequency band is set to the average power of a user signal of the corresponding band.

If the interference measurement information signal RX report is received, the BS proceeds to step 311. In step 311, the BS analyzes the interference measurement information signal to obtain power mask information of the adjacent cells. In step 313, the BS uses the obtained power mask information of the adjacent cells to determine its own power mask. Herein, the power mask information indicates the average power for each frequency band of the interference measurement information signal. That is, the BS detects the average power for each frequency band of the interference measurement information signal from the adjacent BS and uses the detected average power for each frequency band to determine the average power for each frequency band for its own signal. Herein, the power mask determination may be periodically performed.

Figure 5:
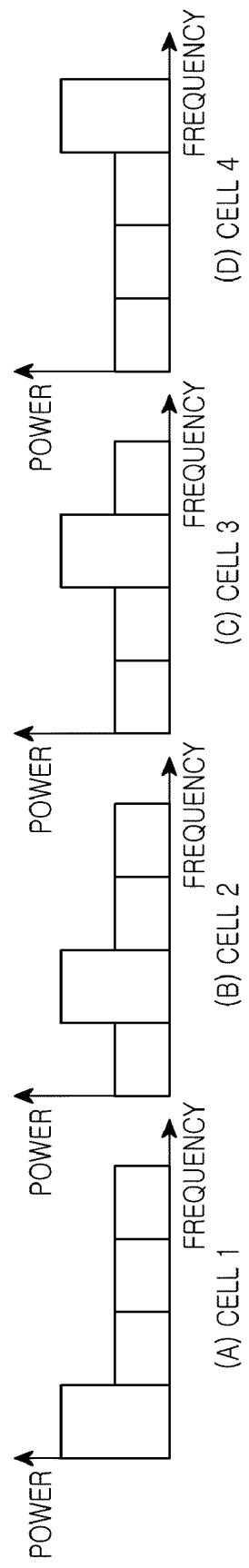
FIG. 5 includes diagrams illustrating a method for determining a power mask of a BS based on power mask information of adjacent cells according to an exemplary embodiment of the present invention.

FIG. 5 includes diagrams illustrating a method for determining the power mask of a BS based on power mask information of adjacent cells according to an exemplary embodiment of the present invention. As illustrated in FIG. 5, if cell 1(A) has the largest signal size at frequency 1, if cell 2(B) has the largest signal size at frequency 2 and if cell 3(C) has the largest signal size at frequency 3, the power mask may be determined so that cell 4(D) has the largest signal size at frequency 4.

In step 315, the BS transmits its own interference measurement information signal according to the determined power mask to the MS. Thereafter, the BS ends the operation.

Herein, the interference measurement information signal of the BS is transmitted through a given frequency and Frequency Allocation (FA). If the cell of the BS is included in the coverage area of another large cell, the BS transmits its own interference measurement information signal through the frequency and FA used by a BS of the large cell.

Figure 4:
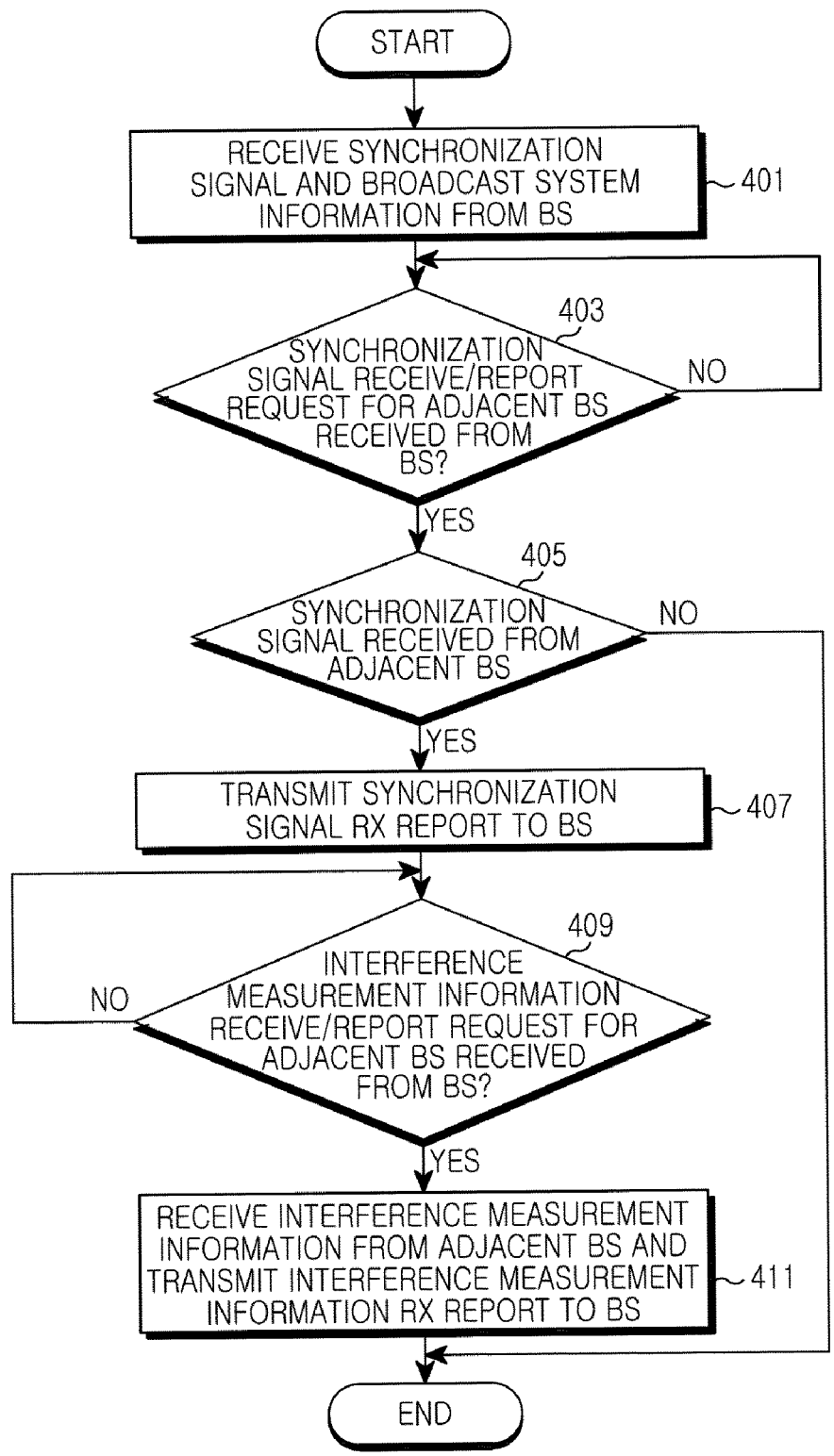
FIG. 4 is a flowchart illustrating an operation of a Mobile Station (MS) for automatically performing an interference control between adjacent cells in a broadband wireless communication system in consideration of various communication environments according to an exemplary embodiment of the present invention.

FIG. 4 is a flowchart illustrating an operation of an MS for automatically performing an interference control between adjacent cells in a broadband wireless communication system in consideration of various communication environments according to an exemplary embodiment of the present invention.

Referring to FIG. 4, in step 401, the MS receives the BS-MS synchronization signal from the BS to detect the start of the super-frame and acquire synchronization. In addition, in step 401, the MS receives the broadcast system information signal from the BS to obtain system information about the cell and the BS. The MS can detect a user signal frame RX method from the information.

In step 403, the MS determines whether a receive/report request for the inter-BS synchronization transmitted by adjacent BSs is received from the BS. If the synchronization signal receive/report request is received, the MS proceeds to step 405. In step 405, the MS determines whether the inter-BS synchronization signal is received from adjacent BSs. If the inter-BS synchronization signal is not received from the adjacent BSs, the MS ends the operation. On the other hand, if the inter-BS synchronization signal is received from the adjacent BSs, the MS proceeds to step 407. In step 407, the MS transmits an RX report for the received synchronization signal to the BS.

In step 409, the MS determines whether a receive/report request for the interference measurement information signal transmitted by adjacent BSs is received from the BS. If the interference measurement information signal receive/report request is received, the MS proceeds to step 411. In step 411, the MS receives an interference measurement information signal from adjacent BSs and transmits an interference measurement information signal RX report to the BS. Thereafter, the MS ends the operation.

Figure 6:
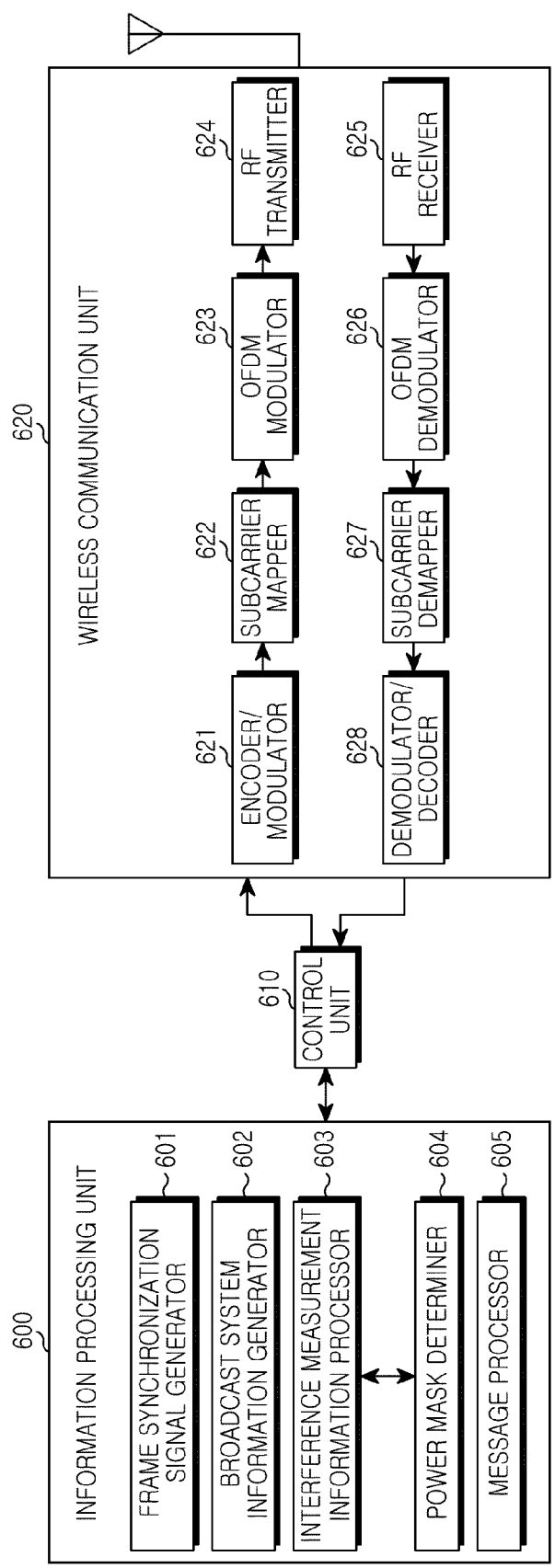
FIG. 6 is a block diagram of a BS in a broadband wireless communication system according to an exemplary embodiment of the present invention.

FIG. 6 is a block diagram of a BS in a broadband wireless communication system according to an exemplary embodiment of the present invention.

Referring to FIG. 6, the BS includes an information processing unit 600, a control unit 610, and a wireless communication unit 620. The information processing unit 600 includes a frame synchronization signal generator 601, a broadcast system information generator 602, an interference measurement information processor 603, a power mask determiner 604, and a message processor 605. The wireless communication unit 620 includes an encoder/modulator 621, a subcarrier mapper 622, an OFDM modulator 623, a Radio Frequency (RF) transmitter 624, an RF receiver 625, an OFDM demodulator 626, a subcarrier demapper 627, and a demodulator/decoder 628.

The control unit 610 performs overall control operations of the BS for communication with the MS. For example, the control unit 610 performs a timing control for transmission of a suitable signal according to the super-frame structure, provides information for operating the information processing unit 600 and the wireless communication unit 620, and performs scheduling for communication of the super-frame. In particular, the control unit 610 performs overall operations for requesting the inter-cell MSs to receive/report an inter-BS synchronization signal transmitted by adjacent BSs, for requesting the intra-cell MSs to receive/report an interference measurement information signal transmitted by adjacent BSs, for analyzing the interference measurement information signal reported from the intra-cell MSs to obtain power mask information of the adjacent cells, for using the obtained power mask information of the adjacent cells to determine its own power mask, and for generating/transmitting its own interference measurement information signal according to the determined power mask.

The frame synchronization signal generator 601 generates a super-frame synchronization signal transmitted through the synchronization interval of the super-frame preamble part of the super-frame, and outputs the same to the control unit 610. The super-frame synchronization signal is used to detect the start of the super-frame, acquire the time/frequency synchronization between the BS and the MS, and discriminate the BS and the cell.

The broadcast system information generator 602 generates broadcast system information transmitted through the broadcast system information interval of the super-frame preamble part of the super-frame, and outputs the same to the control unit 610. Herein, the broadcast system information is used for the MS to perform a communication between the BS and the MS. For example, the information used for the MS includes information about the structure of the super-frame and system parameters.

The interference measurement information processor 603 generates an inter-BS synchronization signal, an interference measurement information signal, and handover-related information through the self-configuration interval of the super-frame preamble part of the super-frame, and outputs the same to the control unit 610. In addition, the interference measurement information processor 603 receives the interference measurement information signal and the synchronization signal from the adjacent BS requested to the MS through the control unit 610, and processes the same. That is, the interference measurement information processor 603 generates a predefined synchronization signal to output the same to the control unit 610, or uses the synchronization signal received through the control unit 610 from the adjacent BS to acquire the inter-BS synchronization. In addition, the interference measurement information processor 603 generates information used for a handover to the BS to be transmitted to the MS communicating with the adjacent BS, and outputs the same to the control unit 610. Herein, the information used for the handover includes identification information of the BS. In addition, the interference measurement information processor 603 generates the interference measurement information signal of the BS to be transmitted to the adjacent BS according to the power mask determined by the power mask determiner 604, and outputs the same to the control unit 610. In addition, the interference measurement information processor 603 outputs the interference measurement information signal received through the control unit 610 from the adjacent BS to the power mask determiner 604. Herein, the interference measurement information signal has a predefined format, and the size of the interference measurement information signal for each frequency band is set to the average power of a user signal of the corresponding band.

The power mask determiner 604 analyzes an interference measurement information signal received from the adjacent BS to obtain the power mask information of adjacent cells, uses the obtained power mask information of the adjacent cells to determine the power mask of the BS, and outputs the determined power mask to the interference measurement information processor 603. That is, the power mask determiner 604 detects the average power for each frequency band of the interference measurement information signal received from the adjacent BS and uses the detected average power for each frequency band to determine the average power for each frequency band for the signal of the BS.

The message processor 605 generates a control message used for communication with the MS and interprets a received control message. For example, the message processor 605 generates control messages of a Media Access Control (MAC) layer, including a Downlink Channel Descriptor/Uplink Channel Descriptor (DCD/UCD) indicating the physical information of a channel and a MAP message indicating resource allocation information, and outputs the same to the control unit 610. In addition, the message processor 605 interprets a ranging message and a control message for a handover received through the control unit 610 from the MS. In addition, the message processor 605 stores data to be transmitted to the MS and data received from the MS, and provides the TX data to the control unit 610 according to the scheduling results of the control unit 610.

The encoder/modulator 621 encodes/modulates an information bit string received from the control unit 610 to generate complex symbols. The subcarrier mapper 622 maps the complex symbols received from the encoder/modulator 621 to a subcarrier. Herein, the subcarrier mapper 622 maps a control signal to a predefined subcarrier and maps a data signal according to the scheduling of the control unit 610. The OFDM modulator 623 performs an Inverse Fast Fourier Transform (IFFT) operation on the signals mapped to the subcarrier by the subcarrier mapper 622 and inserts a CP to generate a time-domain OFDM symbol. The RF transmitter 624 converts the OFDM symbol received from the OFDM modulator 623 into an analog signal, up-converts the analog signal into an RF signal, and transmits the RF signal through an antenna.

The RF receiver 625 receives an RF signal through the antenna, down-converts the RF signal into a baseband signal, and converts the baseband signal into a digital signal. The OFDM demodulator 626 divides the signal received from the RF receiver 625 in units of OFDM symbols, removes the CP, and restores a signal for each subcarrier through a Fast Fourier Transform (FFT) operation. The subcarrier demapper 627 divides the complex symbols mapped to the subcarrier from the signal received from the OFDM demodulator 626 in logical units, and demaps the same. The demodulator/decoder 628 demodulates/decodes the complex symbols received from the subcarrier demapper 627 into an information bit string, and outputs the information bit string to the control unit 610.

Figure 7:
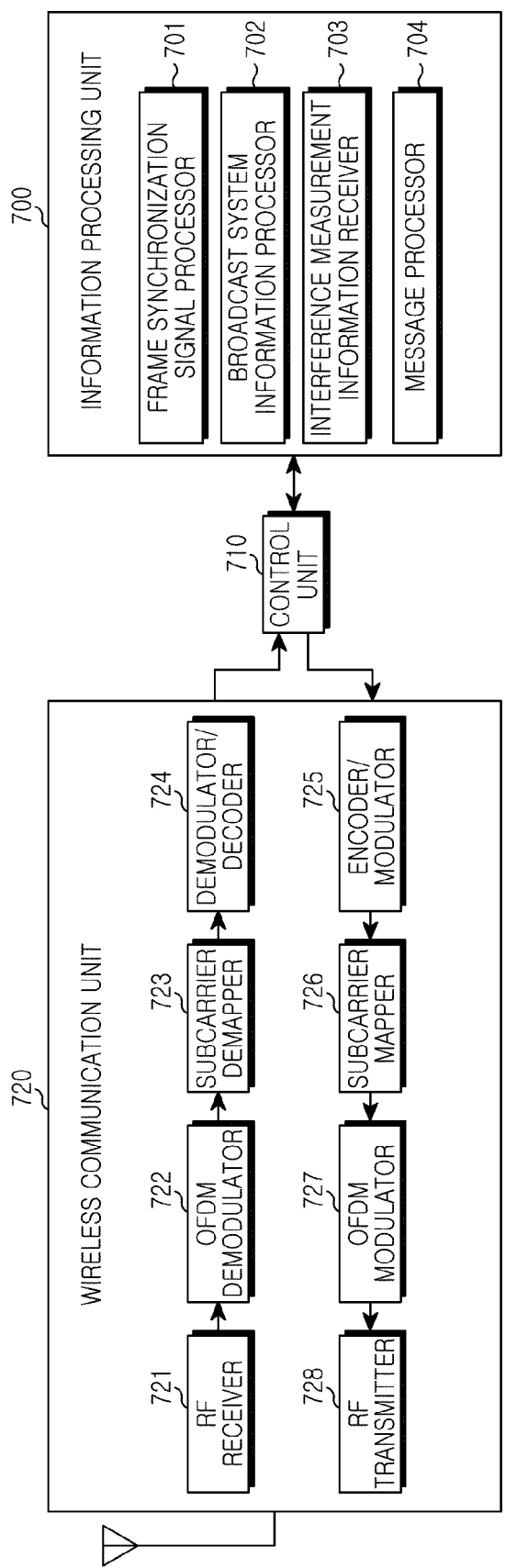
FIG. 7 is a block diagram of an MS in a broadband wireless communication system according to an exemplary embodiment of the present invention.

FIG. 7 is a block diagram of an MS in a broadband wireless communication system according to an exemplary embodiment of the present invention.

Referring to FIG. 7, the MS includes an information processing unit 700, a control unit 710, and a wireless communication unit 720. The information processing unit 700 includes a frame synchronization signal processor 701, a broadcast system information processor 702, an interference measurement information receiver 703, and a message processor 704. The wireless communication unit 720 includes an RF receiver 721, an OFDM demodulator 722, a subcarrier demapper 723, a demodulator/decoder 724, an encoder/modulator 725, a subcarrier mapper 726, an OFDM modulator 727, and an RF transmitter 728.

Referring to FIG. 7, the control unit 710 performs overall control operations of the MS for communication with the BS. For example, the control unit 710 performs a timing control for transmission of a suitable signal according to the super-frame structure, and provides information for operating the information processing unit 700 and the wireless communication unit 720. In particular, the control unit 710 performs overall control operations for receiving a receive/report request for an inter-BS synchronization signal transmitted by adjacent BSs from the BS, for receiving the inter-BS synchronization signal transmitted by the adjacent BSs, for reporting the received inter-BS synchronization signal to the BS, for receiving a receive/report request for an interference measurement information signal transmitted by adjacent BSs from the BS, for receiving the interference measurement information signal from the adjacent BSs, and for reporting the received interference measurement information signal to the BS.

The frame synchronization signal processor 701 acquires super-frame synchronization by using a super-frame synchronization signal received through the synchronization interval of the super-frame preamble part of the super-frame. The super-frame synchronization signal is used to detect the start of the super-frame, acquire the time/frequency synchronization between the BS and the MS, and discriminate the BS and the cell.

The broadcast system information processor 702 obtains system information about the cell and the BS by using broadcast system information received through the broadcast system information interval of the super-frame preamble part of the super-frame. Herein, the broadcast system information is used for the MS to perform a communication between the BS and the MS. For example, the information used for the MS includes information about the structure of the super-frame and system parameters.

The interference measurement information receiver 703 receives an inter-BS synchronization signal, an interference measurement information signal, and handover-related information from an adjacent BS through the self-configuration interval of the super-frame preamble part of the super-frame. That is, the interference measurement information receiver 703 receives a synchronization signal from the adjacent BS according to the request of a serving BS, provides the received synchronization signal to the serving BS, and receives information used for a handover from the adjacent BS. Herein, the information used for the handover includes identification information of the BS. In addition, the interference measurement information receiver 703 receives an interference measurement information signal from adjacent BSs according to the request of a serving BS, and provides the received interference measurement information signal to the serving BS. Herein, the interference measurement information signal has a predefined format, and the size of the interference measurement information signal for each frequency band is set to the average power of a user signal of the corresponding band.

The message processor 704 generates a control message used for communication with the BS and interprets a received control message. For example, the message processor 704 interprets control messages of a Media Access Control (MAC) layer, including a DCD/UCD indicating the physical information of a channel received from the BS and a MAP message indicating resource allocation information, which are received through the control unit 710. In addition, the message processor 704 generates a ranging message and a control message for a handover and outputs the generated ranging message and control message to the control unit 710. Also, the message processor 704 stores data to be transmitted to the BS and data received from the BS, and provides the TX data to the control unit 710 under the control of the control unit 710.

The RF receiver 721 receives an RF signal through an antenna, down-converts the RF signal into a baseband signal, and converts the baseband signal into a digital signal. The OFDM demodulator 722 divides the signal received from the RF receiver 721 in units of OFDM symbols, removes a CP, and restores a signal for each subcarrier through an FFT operation. The subcarrier demapper 723 divides the complex symbols mapped to the subcarrier from the signal received from the OFDM demodulator 722 in logical units, and demaps the same. The demodulator/decoder 724 demodulates/decodes the complex symbols received from the subcarrier demapper 723 into an information bit string, and outputs the information bit string to the control unit 710.

The encoder/modulator 725 encodes/modulates the information bit string received from the control unit 710 to generate complex symbols. The subcarrier mapper 726 maps the complex symbols received from the encoder/modulator 725 to a subcarrier. Herein, the subcarrier mapper 726 maps the complex symbols to radio resources allocated by the BS. The OFDM modulator 727 performs an IFFT operation on the signals mapped to the subcarrier by the subcarrier mapper 726 and inserts the CP to generate a time-domain OFDM symbol. The RF transmitter 728 converts the OFDM symbol received from the OFDM modulator 727 into an analog signal, up-converts the analog signal into an RF signal, and transmits the RF signal through the antenna.

According to exemplary embodiments of the present invention as described above, the BS of the broadband wireless communication system, considering various communication environments, analyzes the interference measurement information signal of the adjacent BSs reported from the intra-cell MSs to obtain the power mask information of the adjacent cells, uses the obtained power mask information of the adjacent cells to determine its own power mask, and then generates/transmits its own interference measurement information signal according to the determined power mask. Accordingly, the BS can easily measure and control the interference of the adjacent cell, thereby making it possible to increase the operation efficiency through interference control of the BS and reduce costs. In addition, exemplary embodiments of the present invention provide a scheme for communicating the interference measurement information signal for each cell so that the resource management can be performed for each of the different frequencies, thereby making it possible to increase the resource management performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Base Station (BS) for interference control in a wireless communication system, the method comprising:
receiving an interference measurement information signal of one or more adjacent BSs;
analyzing the interference measurement information signal of the one or more adjacent BSs to obtain information about the average power for each frequency band used by each of the one or more adjacent BSs;
using the obtained information about the average power for each frequency band of the one or more adjacent BSs to determine the average power for each frequency band to be used by the BS; and
generating an interference measurement information signal of the BS according to the determined average power for each frequency band.

2. The method of claim 1, further comprising transmitting the generated interference measurement information signal.

3. The method of claim 1, wherein the interference measurement information signal of the one or more adjacent BSs is received from one or more intra-cell Mobile Stations (MSs).

4. The method of claim 3, further comprising:
requesting the one or more intra-cell MSs to receive/report an inter-BS synchronization signal transmitted by the one or more adjacent BSs, before receiving the interference measurement information signal; and
requesting the one or more intra-cell MSs to receive/report the interference measurement information signal transmitted by the one or more adjacent BSs, upon receiving the synchronization signal receive (RX) report.

5. The method of claim 4, further comprising transmitting at least one of a BS-MS synchronization signal and a broadcast system information signal to the one or more intra-cell MSs before requesting the synchronization signal receive/report.

6. The method of claim 1, wherein the wireless communication system includes various communication environments.

7. The method of claim 6, wherein a super-frame of the wireless communication system includes a super-frame preamble part having a common signal structure with respect to the different communication environments and at least one other part having a signal structure optimized for each communication environment.

8. The method of claim 7, wherein the interference measurement information signal of the one or more adjacent BSs is communicated through the super-frame preamble part.

9. A method for operating a Mobile Station (MS) for interference control in a wireless communication system, the method comprising:
receiving a receive/report request for an inter-Base Station (BS) synchronization signal transmitted by one or more adjacent BSs from a BS;
transmitting a synchronization signal receive (RX) report to the BS upon receiving the inter-BS synchronization signal from the one or more adjacent BSs;
receiving a receive/report request for an interference measurement information signal transmitted by the one or more adjacent BSs from the BS; and
receiving the interference measurement information signal from the one or more adjacent BSs and transmitting an interference measurement information signal RX report to the BS.

10. The method of claim 9, further comprising receiving at least one of a BS-MS synchronization signal and a broadcast system information signal from the BS before receiving the synchronization signal receive/report request.

11. The method of claim 9, wherein the wireless communication system includes various communication environments.

12. The method of claim 11, wherein a super-frame of the wireless communication system includes a super-frame preamble part having a common signal structure with respect to the different communication environments and at least one other part having a signal structure optimized for each communication environment.

13. The method of claim 12, wherein at least one of the interference measurement information signal and the inter-BS synchronization signal of the one or more adjacent BSs is communicated through the super-frame preamble part.

14. An apparatus of a Base Station (BS) for interference control in a wireless communication system, the apparatus comprising:
an interference measurement information processor for receiving an interference measurement information signal of one or more adjacent BSs and for analyzing the interference measurement information signal of the one or more adjacent BSs to obtain information about the average power for each frequency band used by each of the one or more adjacent BSs; and
a power mask determiner for using the obtained information about the average power for each frequency band of the one or more adjacent BSs to determine the average power for each frequency band to be used by the BS.

15. The apparatus of claim 14, wherein the interference measurement information processor generates an interference measurement information signal of the BS according to the determined average power for each frequency band and transmits the generated interference measurement information signal.

16. The apparatus of claim 14, wherein the interference measurement information processor receives the interference measurement information signal of the one or more adjacent BSs from one or more intra-cell Mobile Stations (MSs).

17. The apparatus of claim 16, wherein the interference measurement information processor requests the one or more intra-cell MSs to receive/report an inter-BS synchronization signal transmitted by the one or more adjacent BSs, before receiving the interference measurement information signal, and requests the one or more intra-cell MSs to receive/report the interference measurement information signal transmitted by the one or more adjacent BSs, upon receiving the synchronization signal receive (RX) report.

18. The apparatus of claim 17, further comprising:
a frame synchronization signal generator for transmitting a BS-MS synchronization signal to the one or more intra-cell MSs; and
a broadcast system information generator for transmitting a broadcast system information signal to the one or more intra-cell MSs.

19. The apparatus of claim 14, wherein the wireless communication system includes various communication environments.

20. The apparatus of claim 19, wherein a super-frame of the wireless communication system includes a super-frame preamble part having a common signal structure with respect to the different communication environments and at least one other part having a signal structure optimized for each communication environment.

21. The apparatus of claim 20, wherein the interference measurement information signal of the one or more adjacent BSs is communicated through the super-frame preamble part.

22. An apparatus of a Mobile Station (MS) for interference control in a wireless communication system, the apparatus comprising:

a frame synchronization signal processor for receiving a Base Station (BS)-MS synchronization signal from a BS; and an interference measurement information receiver for receiving a receive/report request for an inter-BS synchronization signal transmitted by one or more adjacent BSs from the BS, for receiving the inter-BS synchronization signal from the one or more adjacent BSs, for transmitting synchronization signal receive (RX) report to the BS, for receiving a receive/report request for an interference measurement information signal transmitted by the one or more adjacent BSs from the BS, for receiving the interference measurement information signal from the one or more adjacent BSs, and for transmitting an interference measurement information signal RX report to the BS.

23. The apparatus of claim 22, further comprising a broadcast system information processor for receiving a broadcast system information signal from the BS.

24. The apparatus of claim 22, wherein the wireless communication system includes various communication environments.

25. The apparatus of claim 24, wherein a super-frame of the wireless communication system includes a super-frame preamble part having a common signal structure with respect to the different communication environments and at least one other part having a signal structure optimized for each communication environment.

26. The apparatus of claim 25, wherein at least one of the interference measurement information signal and the inter-BS synchronization signal of the one or more adjacent BSs is communicated through the super-frame preamble part.

* * * * *